US011100521B2

(12) United States Patent
Rakshit et al.

(10) Patent No.: US 11,100,521 B2
(45) Date of Patent: Aug. 24, 2021

(54) DYNAMIC BOUNDARY IMPLEMENTATION FOR AN AUGMENTED REALITY APPLICATION

(71) Applicant: International Business Machines Corporation, Armonk, NY (US)

(72) Inventors: Sarbajit K. Rakshit, Kolkata (IN); Eric V. Kline, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/577,827

(22) Filed: Sep. 20, 2019

(65) Prior Publication Data

US 2021/0090100 A1 Mar. 25, 2021

(51) Int. Cl.
| | |
|---|---|
| *G06F 16/29* | (2019.01) |
| *A63F 13/69* | (2014.01) |
| *G06T 11/00* | (2006.01) |
| *A63F 13/79* | (2014.01) |
| *G06Q 30/02* | (2012.01) |
| *G06N 5/04* | (2006.01) |

(52) U.S. Cl.
CPC ......... *G06Q 30/0202* (2013.01); *A63F 13/69* (2014.09); *G06F 16/29* (2019.01); *G06N 5/04* (2013.01); *G06T 11/00* (2013.01); *A63F 13/79* (2014.09); *A63F 2300/5546* (2013.01)

(58) Field of Classification Search
USPC ...................................................... 705/14.58
See application file for complete search history.

(56) References Cited

U.S. PATENT DOCUMENTS

| | | | | |
|---|---|---|---|---|
| 9,292,085 | B2* | 3/2016 | Bennett | G06F 3/017 |
| 9,928,542 | B2* | 3/2018 | Argue | G06Q 30/0641 |
| 2008/0195507 | A1 | 8/2008 | Ratnakar | |
| 2011/0073646 | A1 | 3/2011 | Walker et al. | |
| 2011/0073656 | A1 | 3/2011 | Detwiler et al. | |
| 2012/0194549 | A1* | 8/2012 | Osterhout | G02B 27/0093 345/633 |
| 2014/0100997 | A1 | 4/2014 | Mayerle et al. | |
| 2014/0172640 | A1* | 6/2014 | Argue | G06Q 30/0641 705/26.61 |

(Continued)

OTHER PUBLICATIONS

"RFID and Augmented Reality"; Authors: Lukas Kubac, Vladimir Kebo, Filip Benes, Pavel Stasa (Year: 2013).*

*Primary Examiner* — Victoria E Frunzi
(74) *Attorney, Agent, or Firm* — Garg Law Firm, PLLC; Rakesh Garg; Brian Restauro

(57) ABSTRACT

A player device is associated with a human player, the player associated with a human customer. A boundary is defined, defining a geographic restriction of the player device with respect to a geographic location of the customer. Using a customer movement prediction model, a path of the customer is predicted. The boundary is adjusted corresponding to the predicted path of the customer. Within a augmented reality application presenting information using the player device, a geographic location of an augmented reality item within the augmented reality application is caused to be adjusted, the augmented reality item presented at the adjusted geographic location, the adjusted geographic location determined so as to persuade the human player to remain within the adjusted boundary.

18 Claims, 7 Drawing Sheets

(56) References Cited

U.S. PATENT DOCUMENTS

| | | | |
|---|---|---|---|
| 2015/0165327 A1 | 6/2015 | Chu et al. | |
| 2015/0170256 A1* | 6/2015 | Pettyjohn | G06F 3/04812 |
| | | | 705/14.49 |
| 2016/0140589 A1* | 5/2016 | Deshpande | G06Q 30/0201 |
| | | | 705/7.34 |
| 2016/0335667 A1 | 11/2016 | Aubrey | |
| 2018/0121897 A1 | 5/2018 | Bacallao et al. | |

* cited by examiner

DYNAMIC BOUNDARY IMPLEMENTATION FOR AN AUGMENTED REALITY APPLICATION

TECHNICAL FIELD

The present invention relates generally to a method, system, and computer program product for an augmented reality application. More particularly, the present invention relates to a method, system, and computer program product for a dynamic boundary implementation for an augmented reality application.

BACKGROUND

Augmented reality (AR) is an interactive experience of a real-world environment in which computer-generated perceptual information augments a user's experience of a real-world environment. The computer-generated perceptual information can use any sensory modality, but is most often visual information. The computer-generated perceptual information can be added to the real-world environment, for example by adding an image of a computer-generated object to a real-world scene. The computer-generated perceptual information can also replace part or all of a real-world environment. Replacing all of a real-world environment with a computer-generated environment is also known as virtual reality (VR).

An augmented reality or virtual reality application is a computer program that implements computer-generated perceptual information for presentation on a variety of output devices. When AR images are used, example output devices include AR glasses which display a computer-generated image projected into a user's field of view through the glasses and a camera display which displays a computer-generated image projected into the camera's display of real-world image information. In some AR applications, for example games, users locate and interact with virtual characters, which are displayed as if the characters are present in a user's real-world environment.

SUMMARY

The illustrative embodiments provide a method, system, and computer program product. An embodiment includes a method that associates a player device with a human player, the player associated with a human customer. An embodiment defines a boundary, the boundary defining a geographic restriction of the player device with respect to a geographic location of the customer. An embodiment predicts, using a customer movement prediction model, a path of the customer. An embodiment adjusts, corresponding to the predicted path of the customer, the boundary. An embodiment causes an adjusting of, within a augmented reality application presenting information using the player device, a geographic location of an augmented reality item within the augmented reality application, the augmented reality item presented at the adjusted geographic location, the adjusted geographic location determined so as to persuade the human player to remain within the adjusted boundary.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
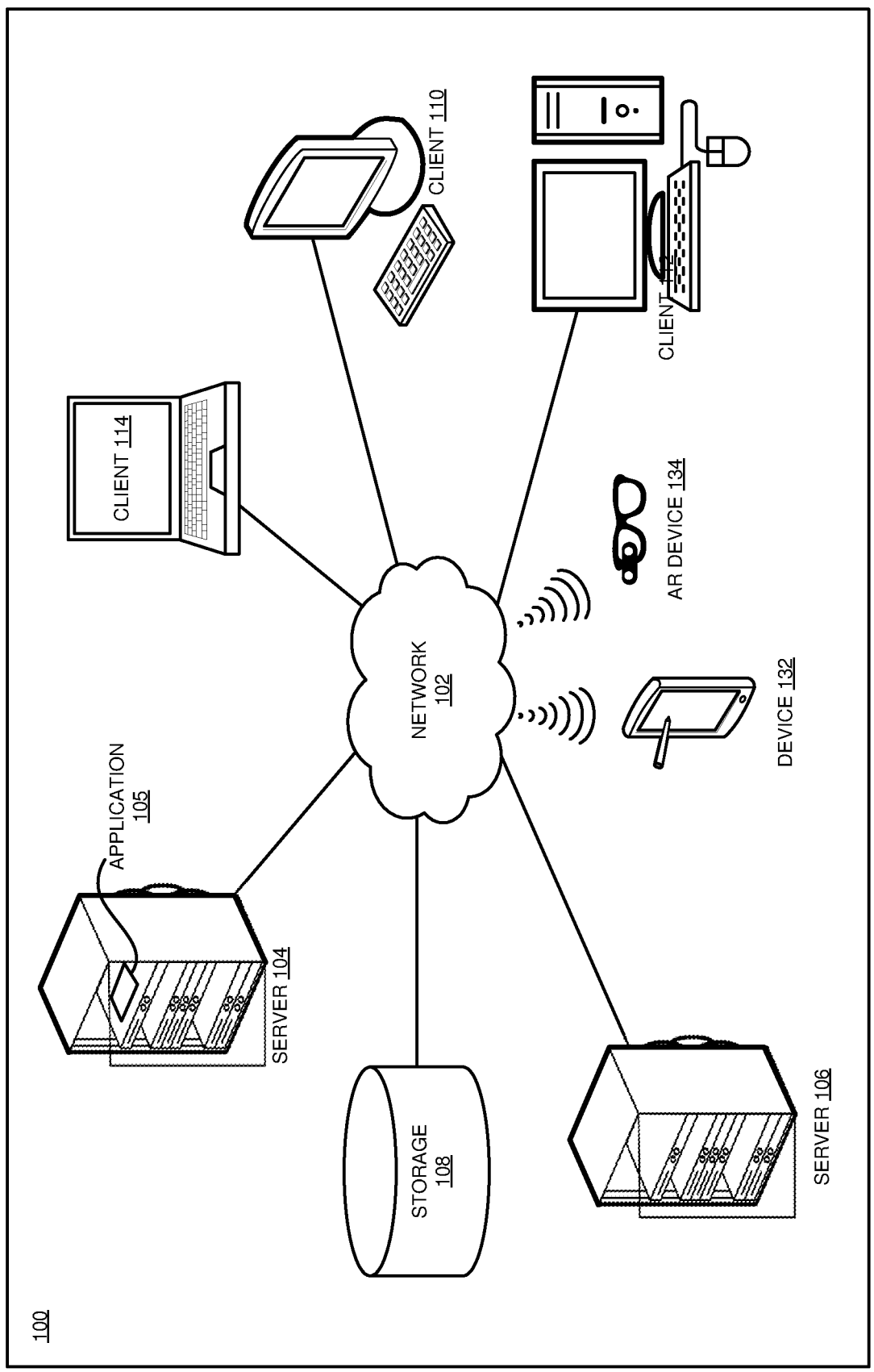
FIG. 1 depicts a block diagram of a network of data processing systems in which illustrative embodiments may be implemented.

The illustrative embodiments recognize that there are situations in which a human user of an augmented reality application should remain near another person who is not using the augmented reality application. A human user of an augmented reality application is referred to herein as a player. A person who is not using the augmented reality application, but who the player remain within a specified distance of, is referred to herein as a customer. In a typical situation, a player is accompanying a customer, but is uninterested or uninvolved in what the customer is currently doing. Instead, the player is using the AR application. However, to allow the customer to supervise the player, to prevent customer and player from becoming unable to locate each other, or for another reason, customer and player should still maintain no more than a maximum distance from each other or remain in sight of each other. For example, a player may be accompanying a customer on a shopping trip to a physical shopping location, but the player is playing an AR game while the customer does the actual shopping nearby. However, to prevent customer and player from becoming unable to locate each other in a large store, customer and player should remain in the same store aisle.

The illustrative embodiments also recognize that it can be difficult for customer and player to maintain an appropriate distance between each other when neither is paying attention to the other. The customer is typically performing a task (e.g. shopping). The player, uninvolved in the customer's task, is likely to be concentrating on the AR application, not on locating the customer. Consequently, the illustrative embodiments recognize that there is an unmet need to implement, for the AR application, a boundary mechanism that encourages the player to remain sufficiently near the customer while interacting with the AR application.

The illustrative embodiments recognize that the presently available tools or solutions do not address these needs or provide adequate solutions for these needs. The illustrative embodiments used to describe the invention generally address and solve the above-described problems and other problems related to a dynamic boundary implementation for an augmented reality application.

An embodiment can be implemented as a software application. The application implementing an embodiment can be configured as a modification of an existing customer service or AR system, as a separate application that operates in conjunction with an existing customer service or AR system, a standalone application, or some combination thereof.

Particularly, some illustrative embodiments provide a method by which a customer's movements can be predicted, a player's boundary within an AR application adjusted according to the prediction, and behavior of the AR application adjusted to encourage the player to remain within the adjusted boundary.

A device used to present AR information is referred to herein as a player device. An embodiment associates a player device with a human player. One embodiment detects an arrival of a player device already associated with a player at a location where the embodiment is to be used. For example, if a player already has a player device, such as AR glasses or a camera display application executing on a smartphone, an embodiment detects the player's existing device. A smartphone is a mobile device with a processor and a memory that is capable of making and receiving cellular telephone calls as well as sending and receiving data over a cellular network or a data interface such as Wi-Fi, and includes a self-locating and location reporting capability, and an operating system capable of running applications. (Wi-Fi is a registered trademark of Wi-Fi Alliance in the United States and other countries.) In another embodiment, a player arrives at a location where the embodiment is to be used, is provided with a player device, and the embodiment associates the player device with the player for use at the location. Once the player device and player are associated with each other, an embodiment tracks a player's location by determining and tracking a location of the associated player device, using any suitable technique and with the player's permission.

An embodiment determines that a player is associated with a customer. One embodiment, when detecting an arrival of a player device already associated with a player at a location where the embodiment is to be used, also detects an arrival, within a predetermined time interval and predetermined proximity to the player device, of a customer's device. A customer's device need not be capable of presenting AR information, but is capable of sending and receiving data over a cellular network or a data interface such as Wi-Fi, and includes a self-locating and location reporting capability and an operating system capable of running applications. Another embodiment, when associating a provided player device with the player for use at a location, also associates a customer's device with the player. Another embodiment, when associating the provided player device with the player for use at a location, also associates a customer with the player using a customer characteristic other than a customer's existing device. Instead, the customer is provided with a device an embodiment uses to track the customer only while at that location. Alternatively, an embodiment uses a system of cameras and a facial or body recognition technique to track the customer, only while at that location and with the customer's permission. More than one player can be associated with one customer.

An embodiment, having associated a player with a customer, can be configured to obtain and use additional customer and player information. The additional customer information includes boundary preference information, which can apply to all locations for which an embodiment is implemented or apply to a specific location or type of location for which an embodiment is implemented. Boundary preference information includes a maximum distance for a player from a customer, as well as, if configured, multiple maximum distances applicable to different portions of a location. For example, a customer might prefer one maximum distance while shopping, but a smaller maximum distance while in line to pay for purchases. Additional customer information includes, if configured, a shopping list of a customer, an Internet browsing history for a customer, a purchase history for a customer, a purchase history for a customer that is specific to a particular location or type of location, a movement history of a customer that is specific to a particular location or type of location, and the like.

An embodiment uses a customer movement prediction model to predict a customer's path through a location for which an embodiment is implemented. If available, an embodiment uses additional customer information for the customer to perform the prediction. For example, if milk is on a customer's shopping list and the location for which an embodiment is implemented is a supermarket, a customer can be expected to proceed through the supermarket entrance to the section where milk is kept. Similarly, if a customer's purchase history includes a pattern of purchasing the same five items every week at this supermarket, the customer can be expected to proceed through the supermarket in a logical order to where each of the five items is kept. Similarly, if a customer's movement history includes a pattern of visiting a supermarket's frozen foods section immediately before paying for the purchase, the customer can be expected to follow a similar pattern during a current visit to this supermarket. However, if data in the additional customer information is not applicable to a particular location, the embodiment does not use the inapplicable data. For example, if milk is on a customer's shopping list but the customer is at an electronics store that does not sell milk, the embodiment does not use the inapplicable data.

If additional customer information for the customer is not available, an embodiment uses data that is not specific to a particular customer to perform the prediction. Data that is not specific to a particular customer includes one or more of data on likely goals for a customer at the location, typical purchase patterns for the location during particular time periods, typical movement patterns through the location, special offers that are likely to drive traffic to a particular portion of the location, and the like. For example, if a location is configured to include only one winding path through an entire store from entrance to exit, most customers can be expected to follow that winding path. Similarly, if a store offers an item at a significantly, time-limited, heavily-advertised discount, most customers arriving at the store can be expected to proceed directly to where the item is kept at the store. Similarly, if a holiday associated with particular foods is upcoming, more customers than usual can be expected to proceed through a supermarket, in a logical order, to where those particular foods are kept.

An embodiment also predicts a speed at which a customer will travel along the predicted path, using a movement history of the customer, a movement model based on other customers' speeds, and any other available information. One embodiment predicts a speed for the customer's entire predicted path. Another embodiment predicts a set of speeds for different portions of the customer's predicted path.

An embodiment configures a boundary for an AR application presenting information on a player's device. The boundary defines a geographic restriction of the player device with respect to a geographic location of the customer. In particular, an embodiment configures the boundary so that the player device, and by extension the player using the player device, is encouraged to remain within a set of specified parameters from a customer associated with the player. The set of specified parameters includes a maximum distance between the customer and player, as well as optional additional criteria, for example that customer and player remain within sight of each other or a specific zone within the location with a different maximum distance.

An embodiment sends the configured boundary to an AR application presenting information on a player's device. The AR application includes one or more AR items, which are presented to a player within the AR application at real-world locations. The AR application implements the boundary by configuring a geographical location of an AR item to be within the boundary. For example, if the AR application is a game having an objective of locating and capturing cartoon characters placed at real-world locations, and a boundary parameter specifies a maximum distance between player and customer as five meters, the game implements the boundary by placing a cartoon character four meters from the customer's current location, thus encouraging the player to capture the cartoon character at a location within the maximum distance.

Corresponding to a customer's predicted path through the location for which an embodiment is implemented, an embodiment adjusts the configured boundary and causes the AR application to implement the adjusted boundary. The AR application implements the adjusted boundary by relocating, if necessary, a geographical location of an AR item to be within the adjusted boundary, or placing a new AR item within the adjusted boundary. As a result, the player is encouraged to proceed to the relocated or new AR item, thus remaining within the adjusted boundary. For example, if the customer is expected to proceed from a supermarket's entrance through the fruits and vegetables sections to the section where the milk is kept, an embodiment readjusts the boundary correspondingly, causing the AR application to locate AR items at locations along the customer's predicted path. In this example, a first AR item might be placed within the fruit section and a section AR item might be placed within the milk section, so as to encourage the player to arrive at the milk section within a predetermined time interval from when the customer is predicted to arrive at the milk section.

An embodiment can also be configured to track a customer's actual path through the location for which an embodiment is implemented. One embodiment tracks a customer's actual path using location information for a customer's device, where the customer's device is an existing device of the customer or a device provided to the customer for use at the location. Another embodiment tracks a customer's actual path using a system of cameras and a facial or body recognition technique to track the customer, only while at that location and with the customer's permission. Another embodiment tracks a customer's actual path using another suitable technique. Corresponding to a customer's actual path through the location for which an embodiment is implemented, an embodiment adjusts the configured boundary and causes the AR application to implement the adjusted boundary in a manner described herein. As a result, the player is encouraged to proceed to the relocated or new AR item, thus remaining within the adjusted boundary.

An embodiment provides optional player status information to a customer or other authorized user. Player status information includes a player's location, for use in aiding a customer in locating a player within a real-world environment.

The manner of implementing a dynamic boundary for an augmented reality application described herein is unavailable in the presently available methods in the technological field of endeavor pertaining to augmented reality systems. A method of an embodiment described herein, when implemented to execute on a device or data processing system, comprises substantial advancement of the functionality of that device or data processing system in predicting a customer's movements, adjusting a player's boundary within an AR application according to the prediction, and behavior of the AR application caused to be adjusted to encourage the player to remain within the adjusted boundary.

The illustrative embodiments are described with respect to certain types of augmented reality applications, customer information, player information, customer patterns, predictions, paths, locations, boundaries, parameters, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
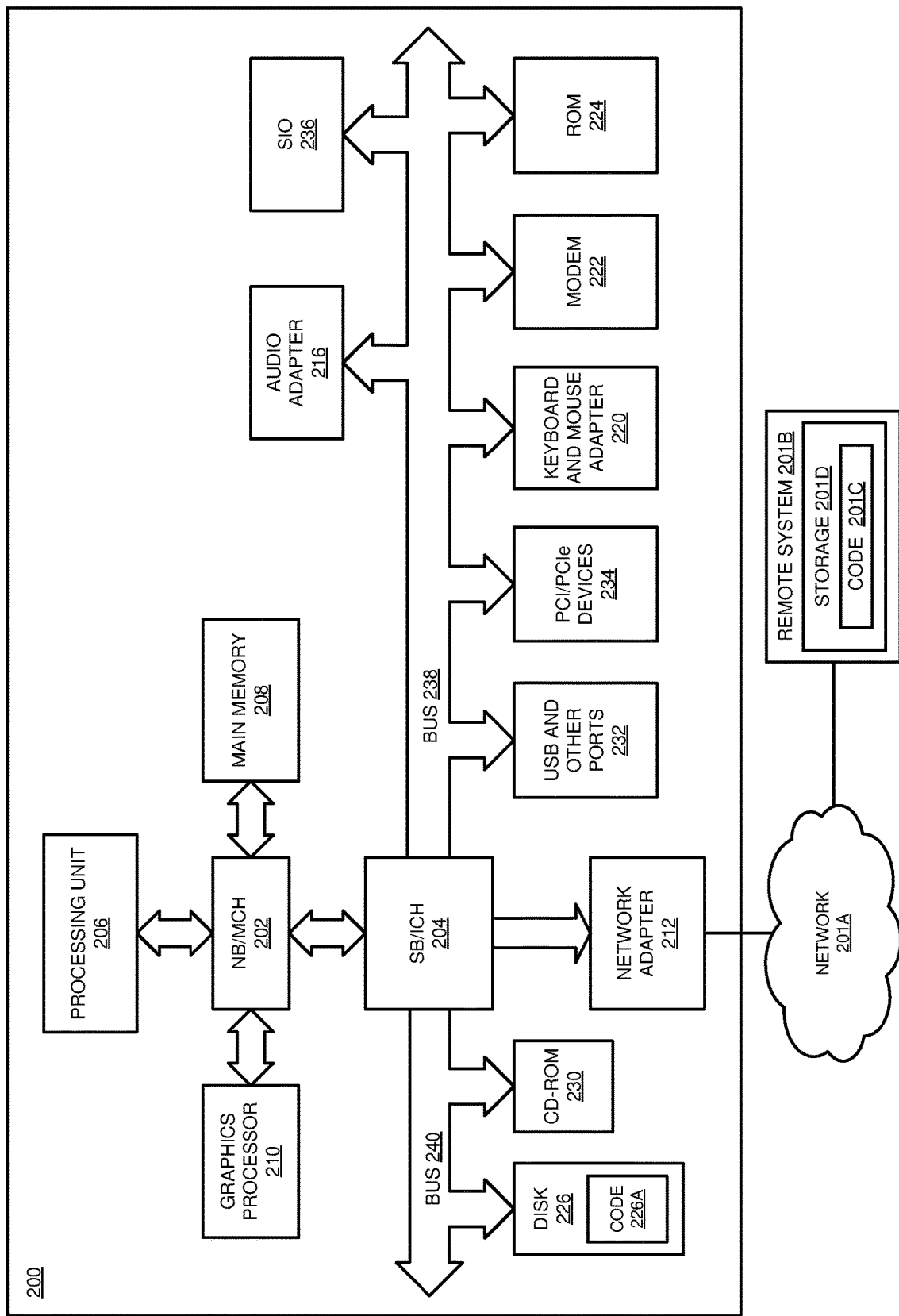
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

AR device 134 is an example of a device described herein adapted to present AR information to a user. For example, device 134 can take the form of a smartphone, a tablet computer, a laptop computer, client 110 in a stationary or a portable form, a wearable computing device such as a pair of glasses projecting AR information into a user's field of view, or any other suitable device. Any software application described as executing in another data processing system in FIG. 1 can be configured to execute in device 134 in a similar manner. Any data or information stored or produced in another data processing system in FIG. 1 can be configured to be stored or produced in device 134 in a similar manner.

Application 105 implements an embodiment described herein. Application 105 can execute in any of servers 104 and 106, clients 110, 112, and 114, device 132, and device 134. An AR application (not shown) can also execute in any of servers 104 and 106, clients 110, 112, and 114, and device 132 to communicate with device 134 and present AR information to a user using device 134.

Servers 104 and 106, storage unit 108, and clients 110, 112, and 114, device 132, and device 134 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
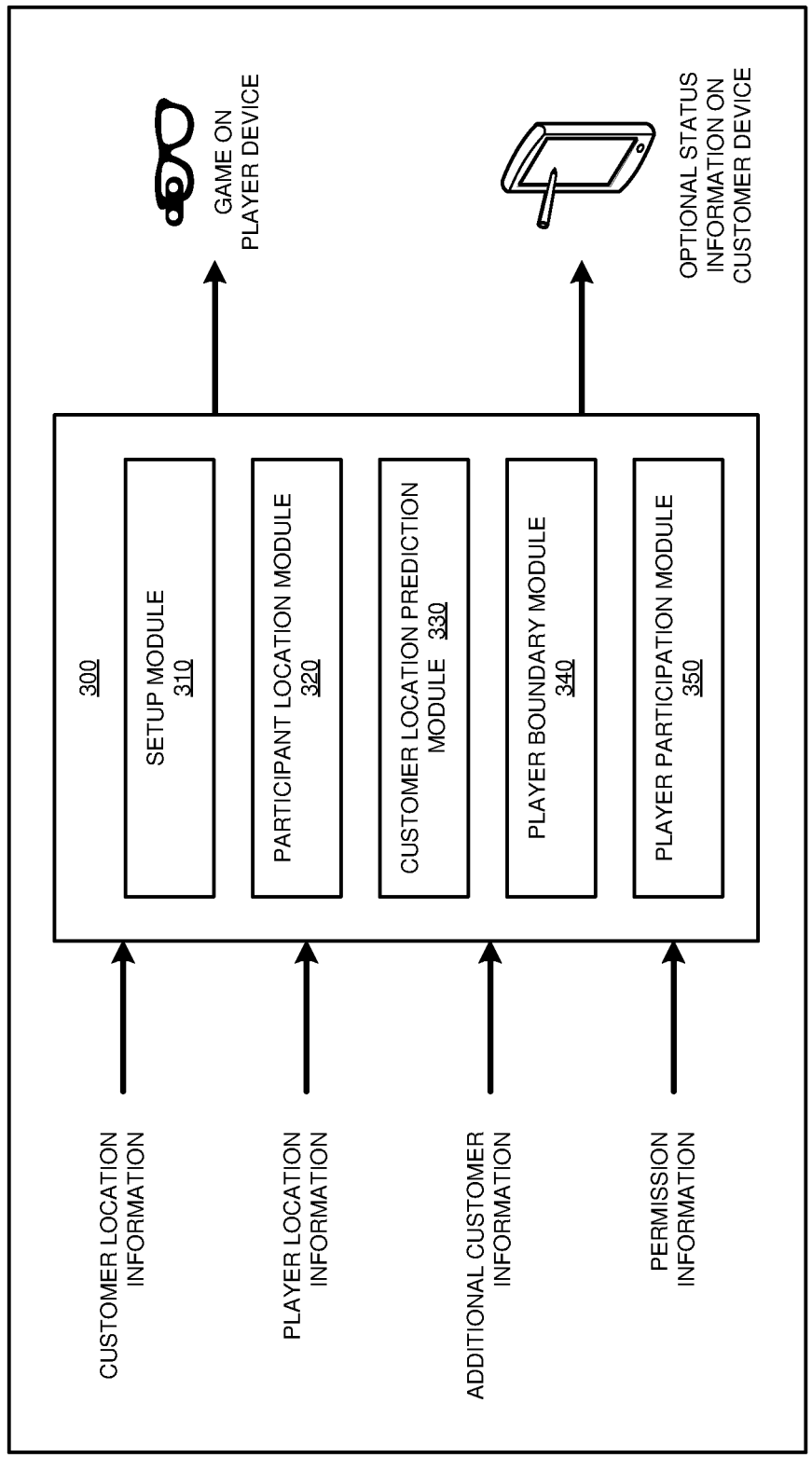
FIG. 3 depicts a block diagram of an example configuration for a dynamic boundary implementation for an augmented reality application in accordance with an illustrative embodiment.

With reference to FIG. 3, this figure depicts a block diagram of an example configuration for a dynamic boundary implementation for an augmented reality application in accordance with an illustrative embodiment. Application 300 is an example of application 105 in FIG. 1 and executes in any of servers 104 and 106, clients 110, 112, and 114, device 132, and device 134 in FIG. 1. Application 300 can also communicate with an AR application executing in any suitable device, such as device 132 or 134, to present AR information to a player using device 132 or 134.

Setup module 310 associates a player device with a human player. One configuration of module 310 detects an arrival of a player device already associated with a player at a location where the embodiment is to be used. Using another configuration of module 310, a player arrives at a location where application 300 is to be used, is provided with a player device, and module 310 associates the player device with the player for use at the location.

Setup module 310 also determines that a player is associated with a customer. One configuration of module 310, when detecting an arrival of a player device already associated with a player at a location where the embodiment is to be used, also detects an arrival, within a predetermined time interval and predetermined proximity to the player device, of a customer's device. Another configuration of module 310, when associating a provided player device with the player for use at a location, also associates a customer's device with the player. Another embodiment, when associating the provided player device with the player for use at a location, also associates a customer with the player using a customer characteristic other than a customer's existing device. Instead, the customer is provided with a device application 300 uses to track the customer only while at that location. More than one player can be associated with one customer.

Setup module 310 configures player and customer permissions. Setup module 310 obtains, if available, and uses additional customer and player information. The additional customer information includes boundary preference information, which can apply to all locations for which an embodiment is implemented or apply to a specific location or type of location for which an embodiment is implemented. Boundary preference information includes a maximum distance for a player from a customer, as well as, if configured, multiple maximum distances applicable to different portions of a location. Additional customer information includes, if configured, a shopping list of a customer, an Internet browsing history for a customer, a purchase history for a customer, a purchase history for a customer that is specific to a particular location or type of location, a movement history of a customer that is specific to a particular location or type of location, and the like. Setup module 310 also configures a set of specified boundary parameters, including a maximum distance between the customer and player, as well as optional additional criteria, for example that customer and player remain within sight of each other or a specific zone within the location with a different maximum distance.

Customer location prediction module 330 uses a customer movement prediction model to predict a customer's path through a location for which application 300 is implemented. If available, module 330 uses additional customer information for the customer to perform the prediction. If data in the additional customer information is not applicable to a particular location, module 330 does not use the inapplicable data. If additional customer information for the customer is not available, module 330 uses data that is not specific to a particular customer to perform the prediction. Data that is not specific to a particular customer includes one or more of data on likely goals for a customer at the location, typical purchase patterns for the location during particular time periods, typical movement patterns through the location, special offers that are likely to drive traffic to a particular portion of the location, and the like.

Module 330 also predicts a speed at which a customer will travel along the predicted path, using a movement history of the customer, a movement model based on other customers' speeds, and any other available information. One configuration of module 330 predicts a speed for the customer's entire predicted path. Another configuration of module 330 predicts a set of speeds for different portions of the customer's predicted path.

Player boundary module 340 configures a boundary for an AR application presenting information on a player's device. In particular, module 340 configures the boundary so that the player device, and by extension the player using the player device, is encouraged to remain within a set of specified parameters from a customer associated with the player.

Player participation module 350 sends the configured boundary to an AR application presenting information on a player's device. The AR application includes one or more AR items, which are presented to a player within the AR application at real-world locations. The AR application implements the boundary by configuring a geographical location of an AR item to be within the boundary.

Corresponding to a customer's predicted path through the location for which an embodiment is implemented, module 340 adjusts the configured boundary and module 350 causes the AR application to implement the adjusted boundary. The AR application implements the adjusted boundary by relocating, if necessary, a geographical location of an AR item to be within the adjusted boundary, or placing a different AR item within the adjusted boundary.

Participant location module 320 tracks a player's location by determining and tracking a location of the associated player device, using any suitable technique and with the player's permission. Module 320 tracks a customer's location by determining and tracking a location of a customer device, either existing or provided to the customer, uses a system of cameras and a facial or body recognition technique to track the customer, or uses another suitable customer-tracking technique. only while at that location and with the customer's permission. Corresponding to a customer's actual path through the location for which application 300 is implemented, module 340 adjusts the configured boundary and module 350 causes the AR application to implement the adjusted boundary in a manner described herein.

Application 300 provides optional player status information to a customer or other authorized user. Player status information includes a player's location, for use in aiding a customer in locating a player within a real-world environment.

Figure 4:
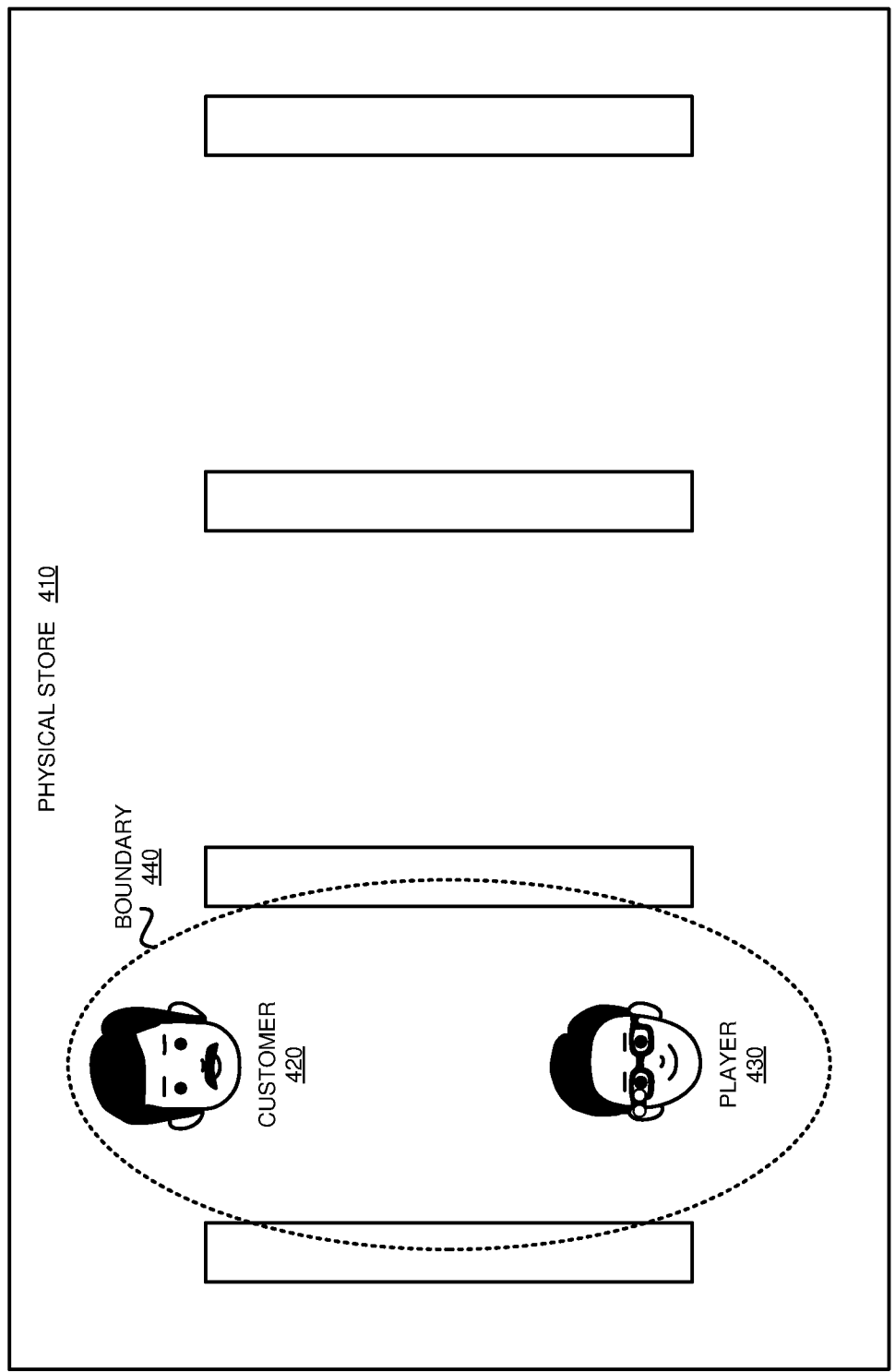
FIG. 4 depicts an example of a dynamic boundary implementation for an augmented reality application in accordance with an illustrative embodiment.

With reference to FIG. 4, this figure depicts an example of a dynamic boundary implementation for an augmented reality application in accordance with an illustrative embodiment. The example can be executed using application 300 in FIG. 3.

As depicted, customer 420 and player 430 are present in physical store 410, a location for which application 300 is implemented. Customer 420 and player 430 are associated with each other, so application 300 has configured boundary 440 defining an area around customer 420 within which player 430 is to be encouraged to remain using AR items presented on player 430's device.

Figure 5:
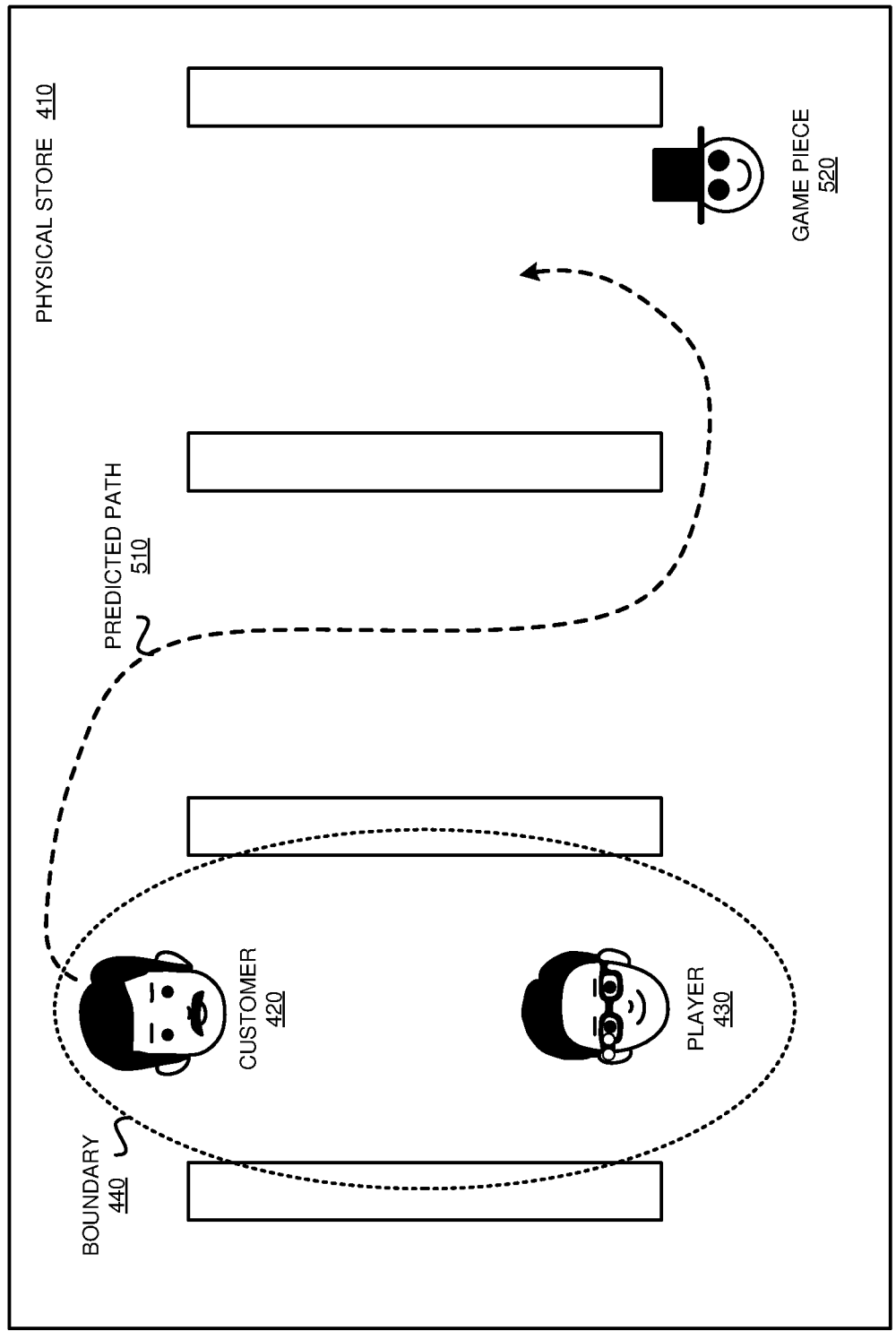
FIG. 5 depicts a continued example of a dynamic boundary implementation for an augmented reality application in accordance with an illustrative embodiment.

With reference to FIG. 5, this figure depicts a continued example of a dynamic boundary implementation for an augmented reality application in accordance with an illustrative embodiment. Physical store 410, customer 420, player 430, and boundary 440 are the same as physical store 410, customer 420, player 430, and boundary 440 in FIG. 4. The example can be executed using application 300 in FIG. 3.

As depicted, application 300 has determined predicted path 510 for customer 420 through physical store 410. As a result, application 300 places game piece 520, an AR item presented on player 430's device, at the end of predicted path 510. As a result, player 430 is encouraged to proceed to the location of game piece 520, thus remaining within the adjusted boundary.

Figure 6:
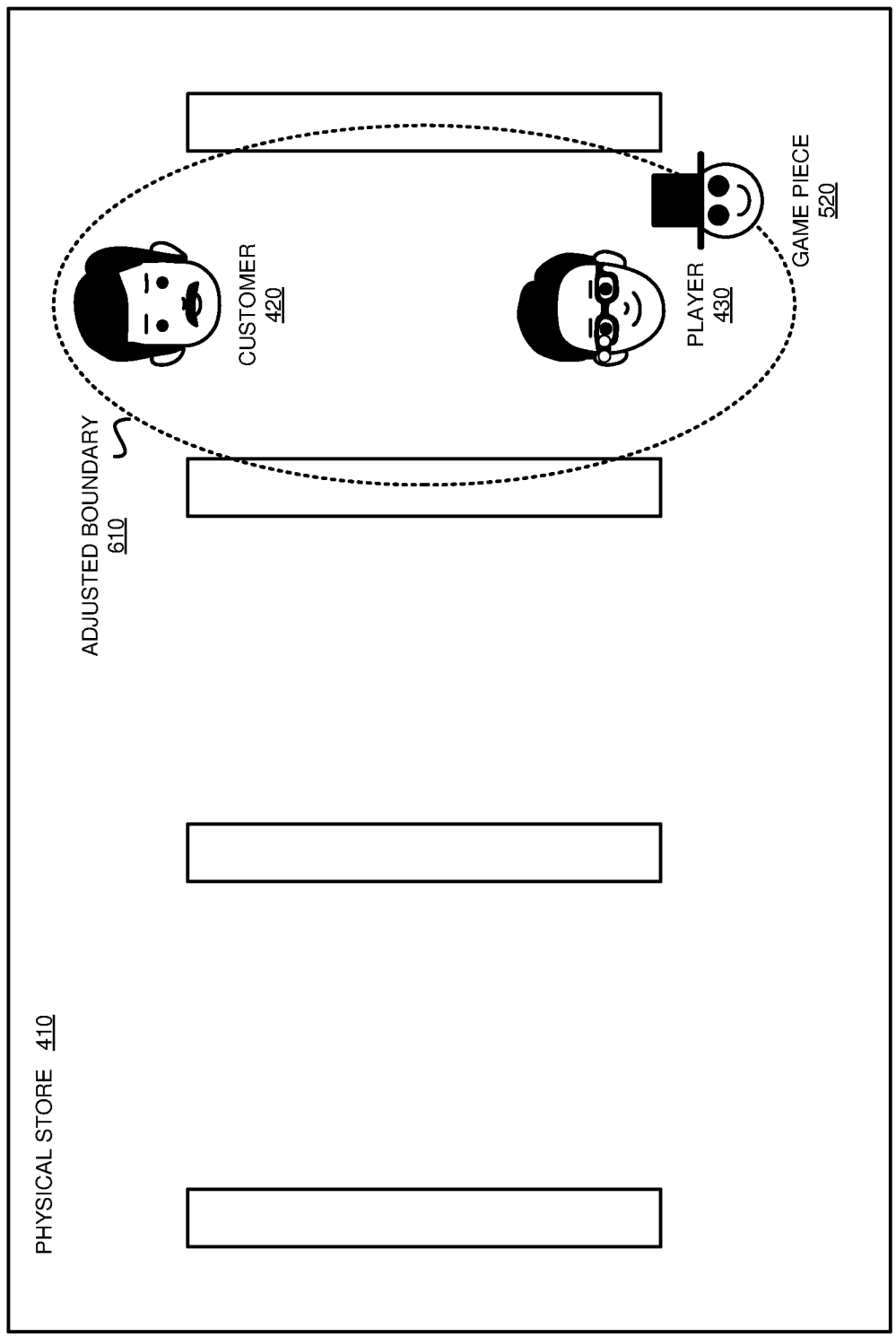
FIG. 6 depicts a continued example of a dynamic boundary implementation for an augmented reality application in accordance with an illustrative embodiment.

With reference to FIG. 6, this figure depicts a continued example of a dynamic boundary implementation for an augmented reality application in accordance with an illustrative embodiment. Physical store 410, customer 420, player 430, and game piece 520 are the same as physical store 410, customer 420, player 430, and game piece 520 in FIG. 5. The example can be executed using application 300 in FIG. 3.

In FIG. 6, customer 420 has arrived at the end of predicted path 510. Application 300 has placed adjusted boundary 610 around customer 420. Player 430 has arrived at the location of game piece 520. Note that both customer 420 and player 430 are within adjusted boundary 610, at a new location in physical store 410.

Figure 7:
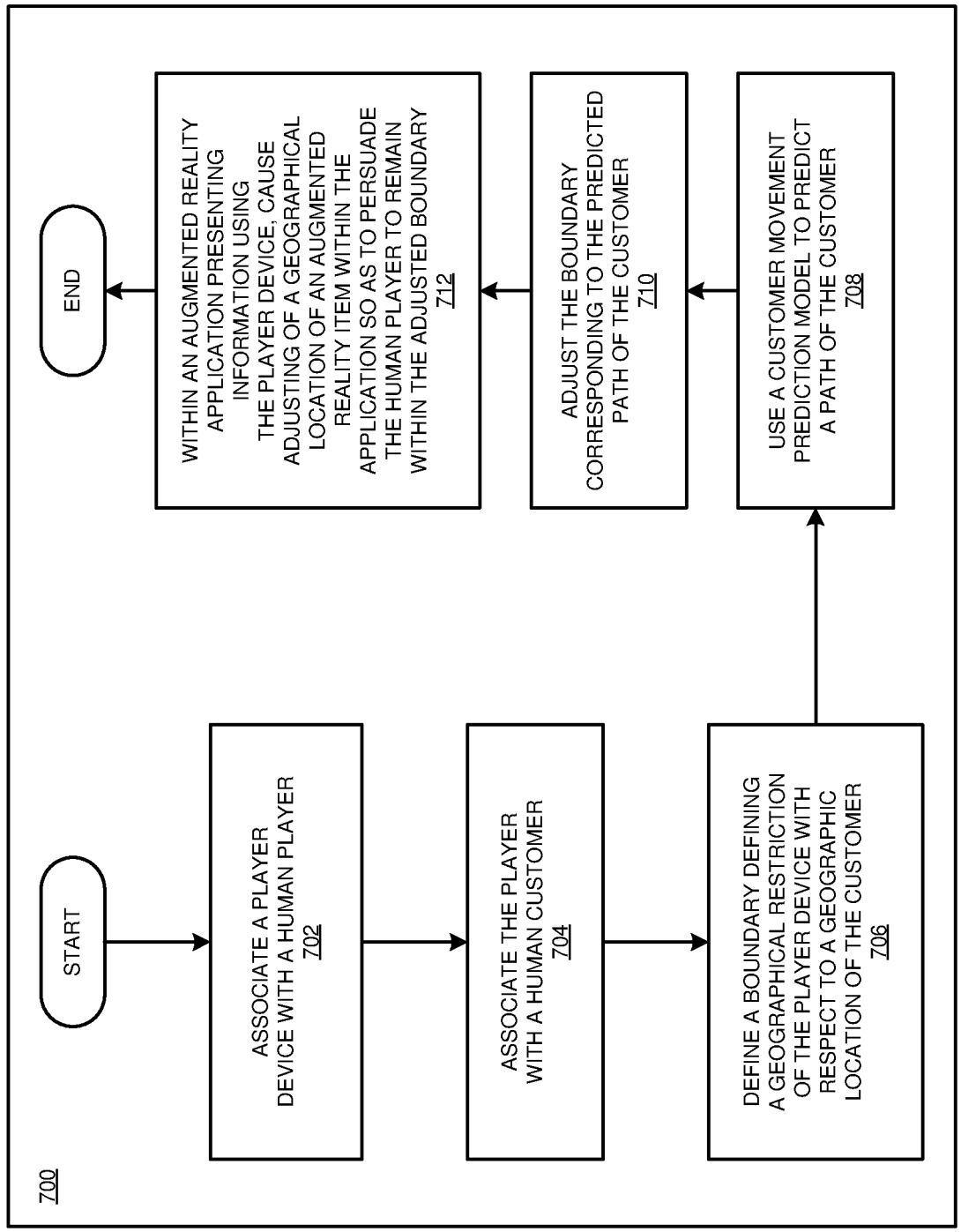
FIG. 7 depicts a flowchart of an example process for a dynamic boundary implementation for an augmented reality application in accordance with an illustrative embodiment.

With reference to FIG. 7, this figure depicts a flowchart of an example process for a dynamic boundary implementation for an augmented reality application in accordance with an illustrative embodiment. Process 700 can be implemented in application 300 in FIG. 3.

In block 702, the application associates a player device with a human player. In block 704, the application associates the human player with a human customer. In block 706, the application defines a boundary defining a geographical restriction of the player device with respect to a geographic location of the customer. In block 708, the application uses a customer movement prediction model to predict a path of the customer. In block 710, the application adjusts the boundary corresponding to the predicted path of the customer. In block 712, the application, within an augmented reality application presenting information using the player device, causes adjusting of a geographical location of an augmented reality item within the application so as to persuade the human player to remain within the adjusted boundary. Then the application ends.

Thus, a computer implemented method, system or apparatus, and computer program product are provided in the illustrative embodiments for a dynamic boundary implementation for an augmented reality application and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    associating a player device with a human player, the player associated with a human customer;
    defining a boundary, the boundary defining a geographic restriction of the player device with respect to a geographic location of the customer;
    predicting, using a customer movement prediction model, a path of the customer within a physical retail establishment and a speed at which the customer will travel along the predicted path, the customer movement prediction model configured using movement pattern and purchase pattern information;
    adjusting, corresponding to the predicted path of the customer and according to a boundary preference parameter specifying a visibility criterion between the player and the customer, the boundary; and
    causing an adjusting of, within an augmented reality application presenting information using the player device, a geographic location of presentation of an augmented reality item within the augmented reality application, the augmented reality item relocated to the adjusted geographic location within the adjusted boundary.

2. The computer-implemented method of claim 1, wherein the predicting is performed using information specific to the customer.

3. The computer-implemented method of claim 1, wherein the predicting is performed using non-customer-specific information.

4. The computer-implemented method of claim 1, wherein the customer is predicted to be at a predicted geographic location on the predicted path, the predicted geographic location being within the adjusted boundary.

5. The computer-implemented method of claim 4, wherein the augmented reality item is presented at the adjusted geographic location at a first time, the first time comprising a time at which the customer is predicted to be at the predicted geographic location.

6. The computer-implemented method of claim 1, further comprising:
    determining, using a customer device, an actual location of the customer;
    readjusting, corresponding to the actual location of the customer, the boundary; and
    causing a placement of, within the augmented reality application, a second augmented reality item at a second geographic location, the second augmented reality item presented at the second geographic location within the readjusted boundary.

7. The computer-implemented method of claim 1, wherein the boundary is adjusted according to a second boundary preference parameter specifying a maximum distance between the player and the customer.

8. A computer usable program product comprising one or more computer-readable storage devices, and program instructions stored on at least one of the one or more storage devices, the stored program instructions comprising:
    program instructions to associate a player device with a human player, the player associated with a human customer;
    program instructions to define a boundary, the boundary defining a geographic restriction of the player device with respect to a geographic location of the customer;
    program instructions to predict, using a customer movement prediction model, a path of the customer within a physical retail establishment and a speed at which the customer will travel along the predicted path, the customer movement prediction model configured using movement pattern and purchase pattern information;

program instructions to adjust, corresponding to the predicted path of the customer and according to a boundary preference parameter specifying a visibility criterion between the player and the customer, the boundary; and program instructions to cause an adjusting of, within an augmented reality application presenting information using the player device, a geographic location of presentation of an augmented reality item within the augmented reality application, the augmented reality item relocated to the adjusted geographic location within the adjusted boundary.

9. The computer usable program product of claim 8, wherein the predicting is performed using information specific to the customer.

10. The computer usable program product of claim 8, wherein the predicting is performed using non-customer-specific information.

11. The computer usable program product of claim 8, wherein the customer is predicted to be at a predicted geographic location on the predicted path, the predicted geographic location being within the adjusted boundary.

12. The computer usable program product of claim 11, wherein the augmented reality item is presented at the adjusted geographic location at a first time, the first time comprising a time at which the customer is predicted to be at the predicted geographic location.

13. The computer usable program product of claim 8, further comprising:

program instructions to determine, using a customer device, an actual location of the customer;

program instructions to readjust, corresponding to the actual location of the customer, the boundary; and program instructions to cause a placement of, within the augmented reality application, a second augmented reality item at a second geographic location, the second augmented reality item presented at the second geographic location within the readjusted boundary.

14. The computer usable program product of claim 8, wherein the boundary is adjusted according to a second boundary preference parameter specifying a maximum distance between the player and the customer.

15. The computer usable program product of claim 8, wherein the stored program instructions are stored in the at least one of the one or more storage devices of a local data processing system, and wherein the stored program instructions are transferred over a network from a remote data processing system.

16. The computer usable program product of claim 8, wherein the stored program instructions are stored in the at least one of the one or more storage devices of a server data processing system, and wherein the stored program instructions are downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to associate a player device with a human player, the player associated with a human customer;

program instructions to define a boundary, the boundary defining a geographic restriction of the player device with respect to a geographic location of the customer;

program instructions to predict, using a customer movement prediction model, a path of the customer within a physical retail establishment and a speed at which the customer will travel along the predicted path, the customer movement prediction model configured using movement pattern and purchase pattern information;

program instructions to adjust, corresponding to the predicted path of the customer and according to a boundary preference parameter specifying a visibility criterion between the player and the customer, the boundary; and program instructions to cause an adjusting of, within an augmented reality application presenting information using the player device, a geographic location of presentation of an augmented reality item within the augmented reality application, the augmented reality item relocated to the adjusted geographic location within the adjusted boundary.

18. The computer system of claim 17, wherein the predicting is performed using information specific to the customer.

* * * * *